(12) United States Patent
Zha (10) Patent No.: US 11,693,271 B2
(45) Date of Patent: Jul. 4, 2023

(54) DISPLAY DEVICE

(71) Applicant: WUHAN CHINA STAR OPTOELECTRONICS TECHNOLOGY CO., LTD, Wuhan (CN)

(72) Inventor: Guowei Zha, Wuhan (CN)

(*) Notice: Subject to any disclaimer, the term of this patent is extended or adjusted under 35 U.S.C. 154(b) by 557 days.

(21) Appl. No.: 16/970,389

(22) PCT Filed: Nov. 12, 2019

(86) PCT No.: PCT/CN2019/117625
§ 371 (c)(1),
(2) Date: Aug. 17, 2020

(87) PCT Pub. No.: WO2021/031399
PCT Pub. Date: Feb. 25, 2021

(65) Prior Publication Data
US 2023/0119598 A1    Apr. 20, 2023

(30) Foreign Application Priority Data
Aug. 22, 2019 (CN) .......................... 201910777076.8

(51) Int. Cl.
*G02F 1/1333* (2006.01)
*G02F 1/1335* (2006.01)

(52) U.S. Cl.
CPC .. *G02F 1/133388* (2021.01); *G02F 1/133528* (2013.01); *G02F 1/133548* (2021.01); *G02F 1/13338* (2013.01)

(58) Field of Classification Search
None
See application file for complete search history.

(56) References Cited

U.S. PATENT DOCUMENTS

| | | | |
|---|---|---|---|
| 2014/0267683 A1 | 9/2014 | Bibl | |
| 2015/0137153 A1 | 5/2015 | Bibl et al. | |
| 2018/0307096 A1 | 10/2018 | Xie | |
| 2020/0192142 A1* | 6/2020 | Kim | G02F 1/133528 |

FOREIGN PATENT DOCUMENTS

| | | |
|---|---|---|
| CN | 105954932 A | 9/2016 |
| CN | 106896577 A | 6/2017 |
| CN | 206557511 U | 10/2017 |
| CN | 107808606 A | 3/2018 |
| CN | 108986678 A | 12/2018 |
| CN | 109001935 A | 12/2018 |
| CN | 109300951 A | 2/2019 |
| CN | 109935173 A | 6/2019 |
| CN | 110034151 A | 7/2019 |
| CN | 110136595 A | 8/2019 |

* cited by examiner

*Primary Examiner* — Phu Vu (57) ABSTRACT

A display device is provided with a backlight module, a lower polarizing plate, a liquid crystal display panel, and an upper polarizing plate. In the display device of the present disclosure, when MicroLED luminescent units are turned on, a normal display is realized within a transparent display area. At the same time, images are collected through the transparent display area anytime and then sensed by an under-screen sensor. The transparent display area and the main display area are seamlessly connected so that there is no visual display interruption and discontinuous boundary, and a complete full-screen design is achieved.

10 Claims, 6 Drawing Sheets

DISPLAY DEVICE

FIELD OF INVENTION

The present disclosure relates to a display technical field, and specifically, to a display device.

BACKGROUND OF INVENTION

In the field of small and medium-sized displays, full-screen technology has become the current key research and development direction, and, that is, how to maximize the screen-body ratios of human-computer interaction interfaces through the development of related technologies. The first-generation full-screen technology mainly focuses on the screen size ratio changing from 16:9 to 18:9 or even larger. In the second-generation full screen, the upper and lower borders of the screen are further compressed, and even flexible folding technology is employed to maximize the display area. Another research direction of the current full screen is how to integrate the fingerprint recognition, camera, face recognition, distance sensing and other sensors of the display terminal into the display area of the display screen, to make the display screen transit from a simple display interface to a comprehensive perceptive and interactive interface.

SUMMARY OF DISCLOSURE

Technical Problem

The mainstream of the current display technologies includes liquid crystal displays (LCD) and organic light emitting diodes (OLED). The LCD is a passive light-emitting technology that the liquid crystal cell is illuminated by an entire surface of a backlight structure to achieve the brightness control of the optical fiber. Yet, in the OLED technology, each of OLED pixels actively emits light, and, therefore, the OLED has advantages of high contrast, thinness, flexibility, and foldability. Furthermore, based on the feature that OLED cannot be a backlight, it is well compatible with current optical fingerprint recognition modules. Therefore, the optical fingerprint recognition has become the "unique advantage" of the OLED. As well, the industry is also developing an OLED-based under-screen camera solution, so that the display mode and the camera mode can be switched to each other, and it has an advantage of omitting the drilling area which is unable to display in the current LCD drilling solution.

MicroLEDs have similar active light emitting characteristics compared to the OLEDs. Due to the stability and high efficiency of inorganic LED, it has technical advantages over OLED, such as long lifespans, high brightness, small chip sizes, and long response times. It has become one of the key development directions in the display industry. However, compared to traditional panel technology of "subtractive manufacturing" methods, such as etching, the microLEDs mainly rely on additive manufacturing methods, so that it has low technical maturity. In particular, the microLEDs encounter inherent challenges of process yields and costs in the transfers of huge amount display pixels, and the microLED technology difficultly becomes a truly mature display technology in a short term.

It is therefore necessary to provide a novel display device in order to solve problems of imperfect vision caused by the split between the camera area and the display area in the prior art, thereby realizing true full-screen technology.

Technical Solutions

An object of the present disclosure is to provide a display device. In the display device of the present disclosure, a transparent display area is provided with small-area MicroLED luminescent units. When the MicroLED luminescent units are turned on, a normal display is realized within the transparent display area. At the same time, images are collected through the transparent display area anytime and then sensed by an under-screen sensor. The transparent display area and the main display area are seamlessly connected, so that there is no visual display interruption and discontinuous boundary, and a complete full-screen design is achieved.

The present disclosure provides a display device, comprising a backlight module; a lower polarizing plate disposed on the backlight module, wherein the lower polarizing plate is provided with a second through hole; a liquid crystal display panel disposed on one side of the lower polarizing plate away from the backlight module, wherein the liquid crystal display panel comprises a main display area and a transparent display area, and the main display area surrounds the transparent display area; an upper polarizing plate disposed on one side of the liquid crystal display panel away from the lower polarizing plate, wherein the upper polarizing plate is provided with a first through hole, and the first through hole and the second through hole correspond to the transparent display area; wherein the first through hole is provided with a plurality of micro light emitting diode (MicroLED) luminescent units.

Furthermore, the transparent display area is provided with a transparent substrate disposed on one side of the liquid crystal display panel away from the backlight module; and the MicroLED luminescent units are disposed on the transparent substrate.

Furthermore, one of the MicroLED luminescent units comprises a red luminescent unit, a green luminescent unit, and a blue luminescent unit.

Furthermore, the MicroLED luminescent units have an area smaller than an area of sub-pixels of the liquid crystal display panel.

Furthermore, the MicroLED luminescent units have a length ranging from 1 to 500 μm, and the sub-pixels of the liquid crystal display panel have a length ranging from 10 to 1000 μm; and the liquid crystal display panel has a transmittance ranging from 50% to 100% within the transparent display area.

Furthermore, the red luminescent unit comprises the blue luminescent unit and a conversion film coated on the blue luminescent unit so that the conversion film is excited by the blue luminescent unit to realize a light emission of the red luminescent unit; the green luminescent unit comprises the blue luminescent unit and a conversion film coated on the blue luminescent unit so that the conversion film is excited by the blue luminescent unit to realize a light emission of the blue luminescent unit; and the conversion film is formed by quantum dots or fluorescent powder.

Furthermore, the upper polarizing plate is a metal wire grid polarizing plate comprising a light transmission substrate; a medium layer disposed on the light transmission substrate; and a plurality of metal wires disposed on one side of the medium layer away from the light transmission substrate; wherein the metal wire grids has a period of 20-500 nm, a duty cycle of 0.1-0.9, and a height of 10-500 nm.

Furthermore, the metal wire grids comprise Al, Ag, or Au which is a material with a larger refractive index; and a material of the medium layer comprises $SiO_2$, SiO, MgO, $Si_3N_4$, $TiO_2$, or $Ta_2O_5$.

Furthermore, the upper polarizing plate is a coated orientation polarizer including a polarizer and an orientation ligand.

Furthermore, the backlight module is an edge-lit backlight module comprising: a light guide plate having a through via corresponding to the transparent display area; and a backlight source disposed on a side of the light guide plate; wherein the through via is provided with a sensor module; and the sensor module includes a fingerprint recognition sensor, a camera sensor, a structured light sensor, a time of flight sensor, a distance sensor, or a light sensor.

In the display device of the present disclosure, a transparent display area is formed by implementing transparent display at a position of the sensor module under the liquid crystal display panel. The small-area MicroLED luminescent units within the transparent display area are formed to achieve display function of the transparent display area. The MicroLED display uses RGB three-color display, and the size of each of the MicroLED luminescent units is smaller than the size of each of the sub-pixels. Light normally passes through the area without MicroLED luminescent units inside the sub-pixels. Therefore, this area can normally display when the MicroLED luminescent units are turned on. The transparent display area and the main display area are seamlessly connected, so that there is no visual display interruption and discontinuous boundary (such as a notch or a hole), and a complete full-screen design is achieved.

BRIEF DESCRIPTION OF DRAWINGS

In order to more clearly illustrate the technical solutions in the embodiment or in the present disclosure, the following drawings, which are intended to be used in the description of the embodiment or of the present disclosure, will be briefly described. It is understood that the drawings described below are merely some embodiments of the present disclosure, and it will be possible to those skilled in the art to obtain other drawings according to these drawings without creative efforts.

display device 10;

liquid crystal display panel 100; backlight module 200; sensor module 204;

first substrate 101; liquid crystal layer 102; second substrate 103;

lower polarizing plate 11; upper polarizing plate 12; first through hole 111;

second through hole 121; transparent substrate 21; MicroLED luminescent unit 22;

red luminescent unit 221; green luminescent unit 222; blue luminescent unit 223;

main display area 110; transparent display area 120; light guide plate 201;

backlight source 202; through via 203; encapsulation layer 13;

sub-pixel 130; light transmission substrate 124; medium layer 122;

metal wire grids 123.

DETAILED DESCRIPTION OF PREFERRED EMBODIMENTS

The description of the following embodiments is used for exemplifying the specific embodiments of the present invention by referring to the accompany drawings. Furthermore, directional terms described by the present invention, such as upper, lower, front, back, left, right, inner, outer, side, etc., are only directions by referring to the accompanying drawings. The names of the elements mentioned in the present disclosure, such as first, second, etc., are only used to distinguish different component parts to be better expressed. In the drawings, like reference numerals designate like elements with similar structures.

Hereinafter, embodiments of the present disclosure will be described in detail. The present disclosure can be shown in many different forms, and it should not be construed as merely the specific embodiment set forth herein. The embodiments of the present disclosure are provided to explain the practical applications of the present disclosure, so that those skilled in the art can understand various embodiments of the present disclosure and various modifications suitable for a specific intended application.

Figure 1:
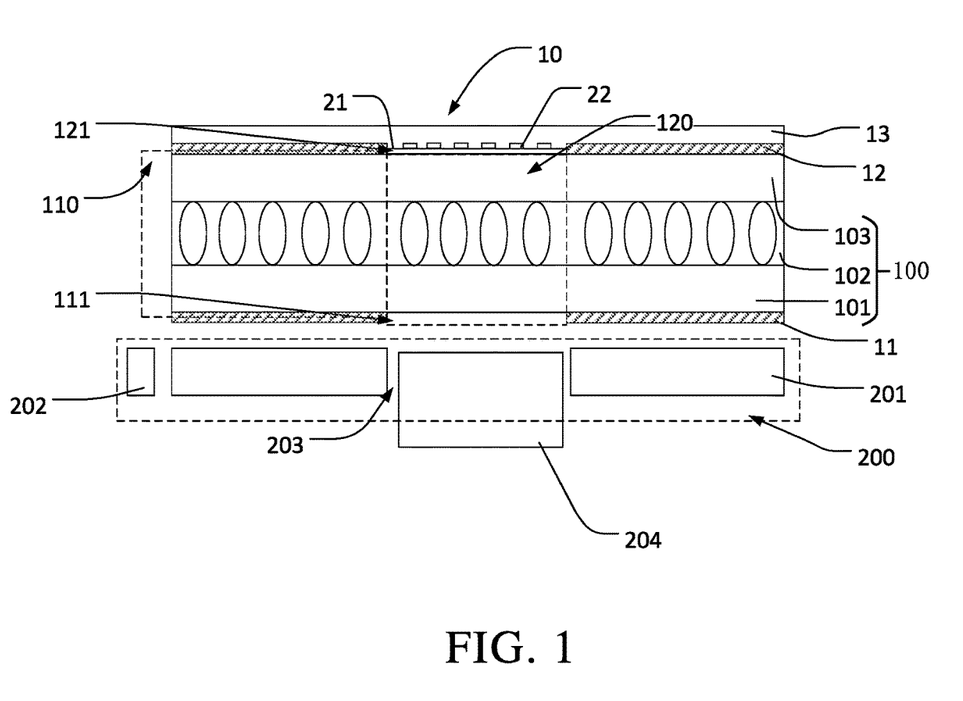
FIG. 1 is a structural view of a display device according to the present disclosure.

As shown in FIG. 1, the present disclosure provides a display device 10 comprising a backlight module 200, a lower polarizing plate 11, a liquid crystal display panel 100, and an upper polarizing plate 12.

The backlight module 200 is an edge-lit backlight module or a direct backlight module. The present disclosure uses the edge-lit backlight module.

The backlight module 200 includes a light guide plate 201 and a backlight source 202.

The light guide plate 201 has a through via 203; the backlight source 202 is disposed on a side of the light guide plate 201; and the through via 203 is provided with a sensor module 204 therein.

The sensor module 204 comprises but not limits to a fingerprint recognition sensor, a camera sensor, a structured light sensor, a time of flight sensor, a distance sensor, or a light sensor.

The lower polarizing plate 11 is disposed on the backlight module 200; the liquid crystal display panel 100 is disposed on one side of the lower polarizing plate 11 away from the backlight module 200.

The liquid crystal display panel 100 comprises a main display area 110 and a transparent display area 120. The main display area 110 surrounds the transparent display area 120. The transparent display area 120 has no pixel circuit, so that the transparency can be achieved. The through via 203 of the light guide plate 201 corresponds to the transparent display area 120.

The liquid crystal display panel 100 includes a first substrate 101, a liquid crystal layer 102, and a second substrate 103. The first substrate 101 is a TFT array substrate. The second substrate 103 is a color filter substrate.

The liquid crystal layer 102 is disposed on one side of the first substrate 101 away from the backlight module 200; the second substrate 103 is disposed on one side of the liquid crystal layer 102 away from the first substrate 101.

The upper polarizing plate 12 is disposed on one side of the liquid crystal display panel 100 away from the lower polarizing plate 11; the upper polarizing plate 12 is provided with a first through hole 111, the lower polarizing plate 11 is provides with a second through hole 121; the first through hole 111 and the second through hole 121 both correspond to the transparent display area 120.

The transparent display area 120 is provides with a transparent substrate 21, the transparent substrate 21 is disposed on one side of the liquid crystal display panel 100 away from the backlight module 200; the transparent substrate 21 is formed by materials with high transmittance, such as glass, colorless PI, or PMMA.

The transparent substrate 21 is provided with a plurality of MicroLED luminescent units 22 thereon. The MicroLED display of the transparent display area 120 uses an on-cell structure. The MicroLED luminescent units 22 can be driven to emit light and display, and the touch control of the transparent display area 120 can be achieved by disposing the transparent substrate 21 on the side of the color filter substrate (i.e. the second substrate 103) and arranging driving wires and TFT switches on the transparent substrate 21.

Figure 2:
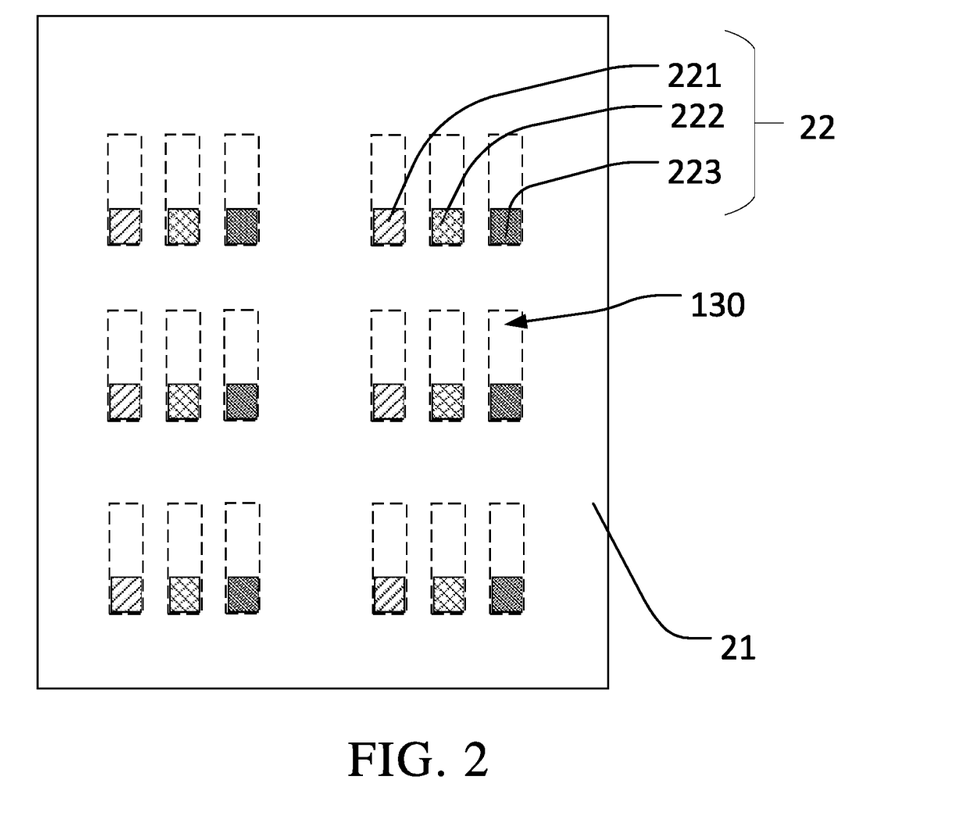
FIG. 2 is a plan view of MicroLED luminescent units of a display device according to the present disclosure.

As shown in FIG. 2, one of the MicroLED luminescent units 22 comprise a red luminescent unit 221, a green luminescent unit 222, and a blue luminescent unit 223. The MicroLED luminescent units 22 have an area smaller than an area of the sub-pixels 130 of the liquid crystal display panel 100. The red luminescent unit 221, the green luminescent unit 222, and the blue luminescent unit 223 are sequentially arranged by an array on the transparent substrate 21.

The sub-pixels 130 in FIG. 2 are labeled by virtual marks. Generally, when the display panel 100 is formed, the areas of the sub-pixels are equally arranged. However, there is no such conventional pixel structure in the transparent display area 120 of the display panel in the present disclosure. The reserved sub-pixel virtual marks are for better preparation of the MicroLED luminescent units 22. The area of the virtual sub-pixels within the transparent display area 120 and the area of the sub-pixels of the main display area 110 are the same.

The MicroLED luminescent units 22 have a length ranging from 1 to 500 µm, and the sub-pixels of the liquid crystal display panel 100 have a length ranging from 10 to 1000 µm. The length of the MicroLED luminescent units 22 should be smaller than the length of the sub-pixel of the liquid crystal display panel 100. It can further ensure that the area of the MicroLED luminescent units 22 is smaller than the area of the sub-pixels of the liquid crystal display panel 100. Generally, the area of the MicroLED luminescent units 22 is about half of the area of the sub-pixels of the liquid crystal display panel 100, so that the high transmittance of the transparent display area can be ensured.

When selecting the embodiment of the length of the MicroLED luminescent units 22, for ensuring the length of the MicroLED luminescent units 22 to be smaller than the length of the sub-pixels of the liquid crystal display panel 100, the area of the MicroLED luminescent units 22 is smaller than the area of the sub-pixels of the liquid crystal display panel 100. Finally, the transparency of the transparent display area 120 can reach 50%-100%. The higher transparency the better. Thus, the external light can be transmitted more through the transparent display area 120, and the sensor module 204 can receive more external signals.

The red luminescent unit 221 includes a blue luminescent unit 223 and a conversion film coated on the blue luminescent unit 223, so that the conversion film is excited by the blue luminescent unit 223 to realize a light emission of the red luminescent unit 221. The green luminescent unit 222 comprises the blue luminescent unit 223 and a conversion film coated on the blue luminescent unit 223, so that the conversion film is excited by the blue luminescent unit 223 to realize a light emission of the blue luminescent unit 223. The conversion film is formed by quantum dots or fluorescent powder.

An encapsulation layer 13 is disposed on the MicroLED luminescent units 22 and the upper polarizing plate 12 for isolating water and oxygen so as to protect the MicroLED luminescent units 22 and the liquid crystal display panel 100.

In the transparent display area 120, the liquid crystal display panel 100 is driven by a passive method or an active method. The active method comprises using amorphous silicon, indium gallium zinc oxide, and low temperature polysilicon.

Figure 3:
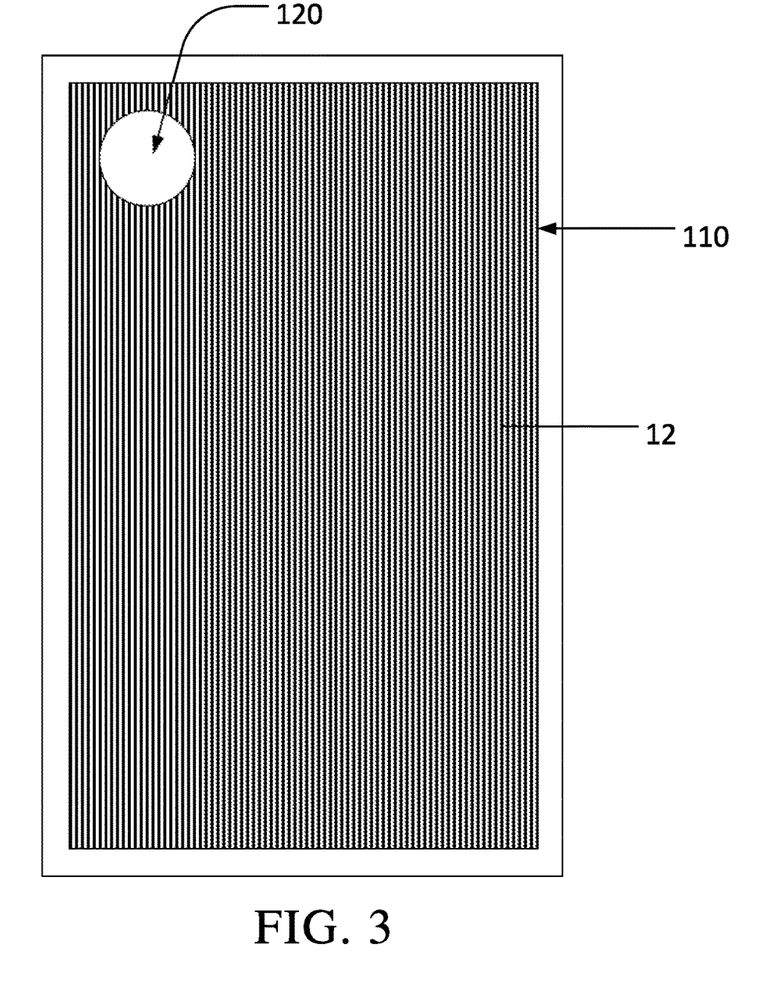
FIG. 3 is a plan view of a polarizing plate of a display device according to the present disclosure.

As shown in FIG. 3, the upper polarizing plate 12 can use an in-cell or an on-cell structure to achieve the touch control of the touch control display panel. In the transparent display area 120, there is no upper polarizing plate 12.

The upper polarizing plate 12 may be a metal wire grid polarizing plate or a coated orientation polarizer. This allows normal display of the transparent display area 120 and the sub-pixels of the main display area 110, so that seamless connection between the transparent display area 120 and the main display area 100 can be achieved to avoid the problem of poor precision of the conventional adhered polarizing plate.

Figure 4:
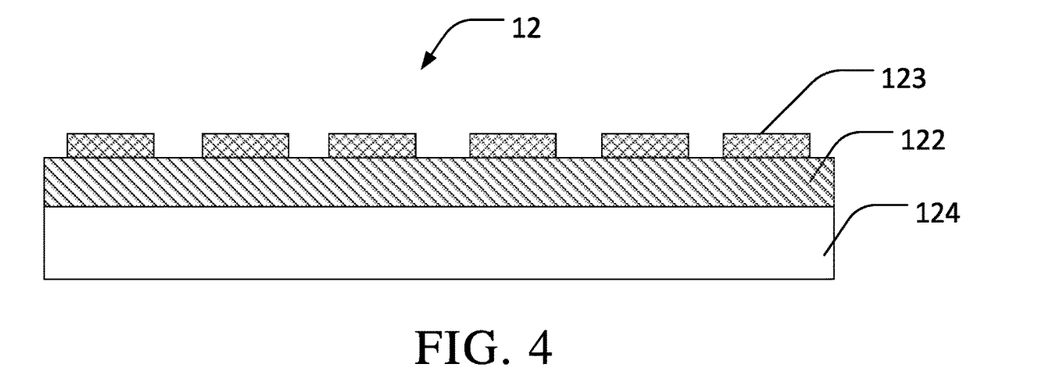
FIG. 4 is a structural view of a metal wire grid polarizing plate of a display device according to the present disclosure.

As shown in FIG. 4, if the upper polarizing plate 12 is a metal wire grid polarizing plate, the metal wire grid polarizing plate includes a light transmission substrate 124, a medium layer 122, and a plurality of metal wire grids 123.

The medium layer 122 is disposed on the light transmission substrate 124. The metal wire grids 123 is disposed on one side of the medium layer 122 away from the light transmission substrate 124.

The metal wire grids 123 has a period of 20-500 nm, most preferably 200 nm, also preferably 50 nm, 100 nm, 300 nm, and 400 nm. The metal wire grids 123 has a duty cycle of 0.1-0.9, most preferably 0.5, also preferably 0.2, 0.3, 0.6, or 0.8. The metal wire grids 123 has a height ranging from 10 to 500 nm, most preferably 200 nm, also preferably 50 nm, 100 nm, 300 nm, or 400 nm.

The metal wire grids 123 is formed by a material with a larger refractive index, such as Al, Ag, or Au. A material of the medium layer 122 comprises $SiO_2$, SiO, MgO, $Si_3N_4$, $TiO_2$, or $Ta_2O_5$.

If the upper polarizing plate 12 is a coated orientation polarizer, the coated orientation polarizer comprises a polarizer and an orientation ligand. The upper polarizing plate 12 is precisely applied on the main display area 110 by coating to make the polarizer have a consistent orientation by way of overprinting or light alignment, thereby allowing the upper polarizing plate 12 to obtain a better polarization effect.

Figure 5:
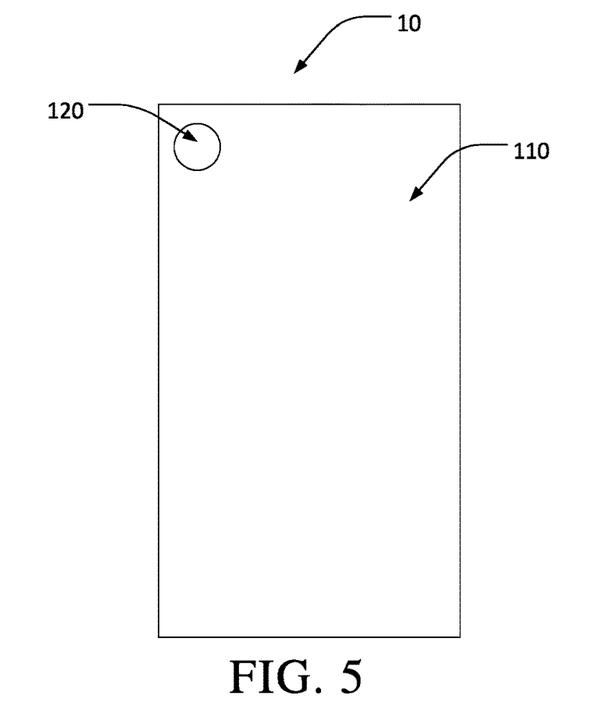
FIG. 5 is a structural view of a camera round hole screen of a display device according to the present disclosure.
Figure 6:
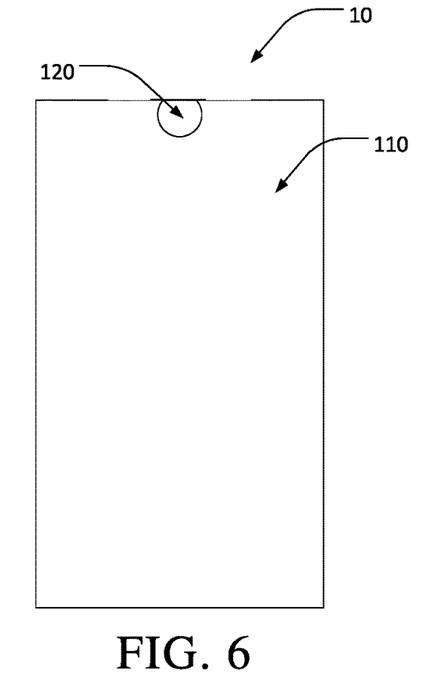
FIG. 6 is a structural view of a water drop screen of a display device according to the present disclosure.
Figure 7:
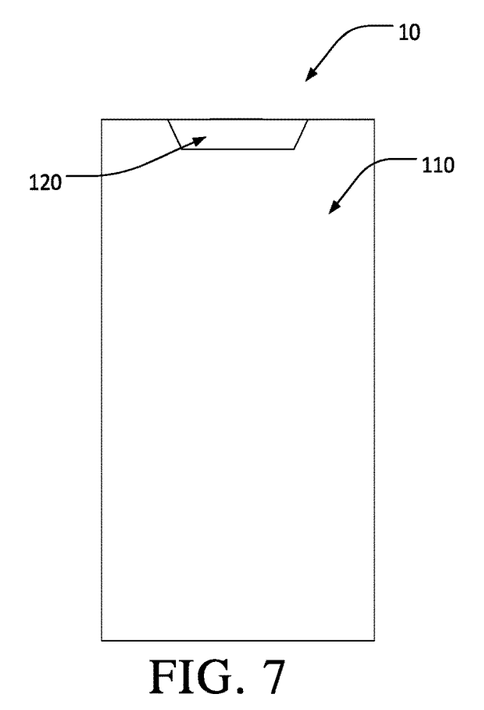
FIG. 7 is a structural view of a water drop screen of a display device according to the present disclosure.
Figure 8:
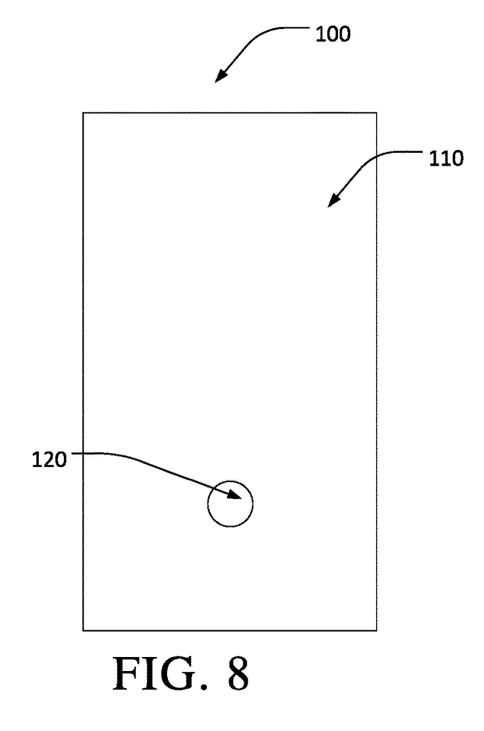
FIG. 8 is a structural view of a fingerprint recognition round hole screen of a display device according to the present disclosure.
Figure 9:
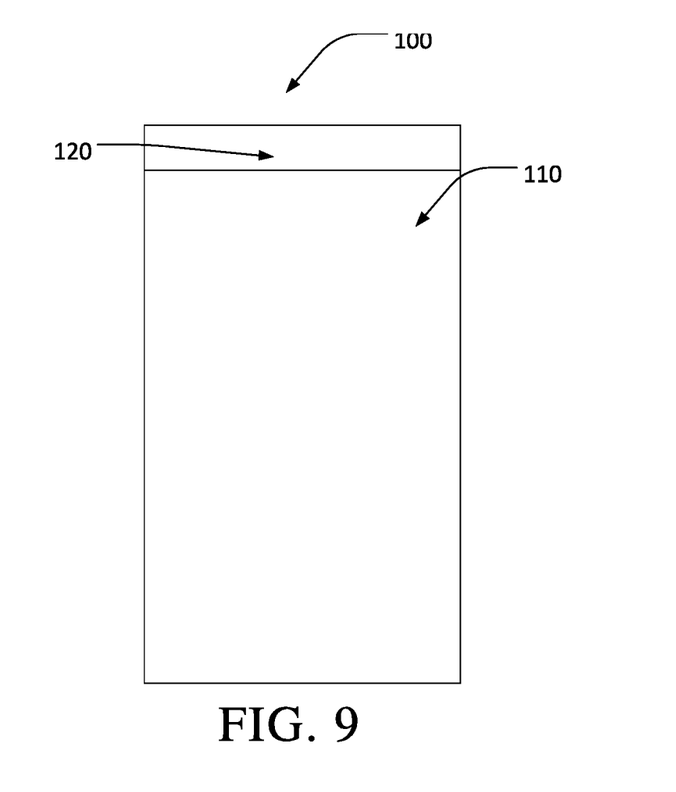
FIG. 9 is a structural view of a square screen of a display device according to the present disclosure.

The shape of the transparent display area 120 mentioned in the present disclosure is not limited, and is generally a round hole shape (see FIG. 5 or FIG. 8, FIG. 5 is suitable for a camera sensor, FIG. 8 is suitable for a fingerprint recognition sensor). The shape can also be "a water drop" (see FIG. 6), "a groove screen" (see FIG. 7), a square screen (see FIG. 9) and "a widow's peak". The transparent display area 120 has a smaller area, such as an area smaller than 10*10 mm, and the transparent display area 120 requires fewer pixels, so as to ensure the transfer yield and cost control of the MicroLED in the transparent display area 120.

The present disclosure provides a display device 10 having a transparent display area 120 formed by implementing transparent display at a position of the sensor module 204 under the liquid crystal display panel 100. Additionally, the MicroLED luminescent units 22 with a small area are formed at a position in the stacking direction by an on-cell technology on the color filter substrate.

The MicroLED display uses RGB three-color display, and the size of each of the MicroLED luminescent units 22 is smaller than the size of each of the sub-pixels 130. Light normally passes through the area without MicroLED luminescent units 22 inside the sub-pixels 130 (for example, the luminescent unit area within the dotted area marked in FIG. 2, and the area outside the luminescent units can normally pass light).

It is therefore that the transparent display area can display normally when the MicroLED luminescent units 22 are turned on. At the same time, images are collected through the transparent display area 120 anytime and then sensed by an under-screen sensor, so that various under-screen sensing solutions such as the under-screen fingerprint recognition, the under-screen camera, the under-screen face recognition, and under-screen distance sensing can be achieved.

Moreover, the transparent display area 120 and the main display area 110 are seamlessly connected, so that there is no visual display interruption and discontinuous boundary (such as notch or hole), and a complete full-screen design is achieved. Furthermore, because the MicroLED has the characteristics of high brightness and a long lifespan, some pixels can be used as a fill light, an indicator light, and other functions.

The metal wire grid polarizing plate of the main display area 110 is prepared by a nano-imprint technology or by a coated orientation polarizer, so as to realize the seamless connection between the main display area 110 and the transparent display area, to avoid the problem of poor precision of the conventional adhered polarizer.

The technical scope of the present disclosure is not limited to the description, and one skilled in the art can make various variations and modifications to the embodiment without departing from the technical concept of the present disclosure, and these variations and modifications should be within the scope of the present disclosure.

What is claimed is:
1. A display device, comprising:
a backlight module;
a lower polarizing plate disposed on the backlight module, wherein the lower polarizing plate is provided with a second through hole;
a liquid crystal display panel disposed on one side of the lower polarizing plate away from the backlight module, wherein the liquid crystal display panel comprises a main display area and a transparent display area, and the main display area surrounds the transparent display area;
an upper polarizing plate disposed on one side of the liquid crystal display panel away from the lower polarizing plate, wherein the upper polarizing plate is provided with a first through hole, and the first through hole and the second through hole correspond to the transparent display area;
wherein the first through hole is provided with a plurality of micro light emitting diode (MicroLED) luminescent units.

2. The display device according to claim 1, wherein the transparent display area is provided with a transparent substrate disposed on one side of the liquid crystal display panel away from the backlight module; and
the MicroLED luminescent units are disposed on the transparent substrate.

3. The display device according to claim 2, wherein one of the MicroLED luminescent units comprises a red luminescent unit, a green luminescent unit, and a blue luminescent unit.

4. The display device according to claim 2, wherein the MicroLED luminescent units have an area smaller than an area of sub-pixels of the liquid crystal display panel.

5. The display device according to claim 4, wherein the MicroLED luminescent units have a length ranging from 1 to 500 μm, and the sub-pixels of the liquid crystal display panel have a length ranging from 10 to 1000 μm; and
the liquid crystal display panel has a transmittance ranging from 50% to 100% within the transparent display area.

6. The display device according to claim 3, wherein the red luminescent unit comprises the blue luminescent unit and a conversion film coated on the blue luminescent unit so that the conversion film is excited by the blue luminescent unit to realize a light emission of the red luminescent unit;
the green luminescent unit comprises the blue luminescent unit and a conversion film coated on the blue luminescent unit so that the conversion film is excited by the blue luminescent unit to realize a light emission of the blue luminescent unit; and
the conversion film is formed by quantum dots or fluorescent powder.

7. The display device according to claim 1, wherein the upper polarizing plate is a metal wire grid polarizing plate;
the metal wire grid polarizing plate comprises:
a light transmission substrate;
a medium layer disposed on the light transmission substrate; and
a plurality of metal wires disposed on one side of the medium layer away from the light transmission substrate;
wherein the metal wire grids has a period of 20-500 nm, a duty cycle of 0.1-0.9, and a height of 10-500 nm.

8. The display device according to claim 7, wherein the metal wire grids comprise Al, Ag, or Au which is a material with a larger refractive index; and
a material of the medium layer comprises $SiO_2$, SiO, MgO, $Si_3N_4$, $TiO_2$, or $Ta_2O_5$.

9. The display device according to claim 1, wherein the upper polarizing plate is a coated orientation polarizer including a polarizer and an orientation ligand.

10. The display device according to claim 1, wherein
the backlight module is an edge-lit backlight module comprising:
a light guide plate having a through via corresponding to the transparent display area; and
a backlight source disposed on a side of the light guide plate;
wherein the through via is provided with a sensor module; and
the sensor module includes a fingerprint recognition sensor, a camera sensor, a structured light sensor, a time of flight sensor, a distance sensor, or a light sensor.

* * * * *